United States Patent [19]

Kunze et al.

[11] Patent Number: 5,408,867

[45] Date of Patent: Apr. 25, 1995

[54] METHOD AND APPARATUS FOR CALIBRATING AN ULTRASONIC LEAK LOCATION

[75] Inventors: Ulrich Kunze; Walter Knoblach, both of Erlangen; Günther Schulze, Fürth, all of Germany

[73] Assignee: Siemens Aktiengesellschaft, Munich, Germany

[21] Appl. No.: 109,385

[22] Filed: Aug. 19, 1993

[30] Foreign Application Priority Data

Aug. 19, 1992 [DE] Germany .................. 42 27 460.5

[51] Int. Cl.$^6$ ............................................. G01M 3/24
[52] U.S. Cl. .................................. 73/40.5 A; 73/1 R
[58] Field of Search .............. 73/40.5 R, 40.5 A, 1 R, 73/592, 587

[56] References Cited

U.S. PATENT DOCUMENTS

| | | | |
|---|---|---|---|
| 3,814,207 | 6/1974 | Kusada et al. | 73/40.5 A |
| 4,321,528 | 3/1982 | Reichel et al. | 324/77 D |
| 4,457,163 | 7/1984 | Jäckle | 73/40.5 A |
| 4,640,121 | 2/1987 | Leuker et al. | 73/40.5 A |
| 4,858,462 | 8/1989 | Coulter et al. | 73/40.5 A |
| 5,031,446 | 7/1991 | Saito et al. | 73/40.5 A |

FOREIGN PATENT DOCUMENTS

| | | |
|---|---|---|
| 0091087 | 10/1983 | European Pat. Off. . |
| 0140174 | 12/1987 | European Pat. Off. . |
| 0444200 | 9/1991 | European Pat. Off. . |
| 0451649 | 10/1991 | European Pat. Off. . |
| 2503363 | 10/1982 | France . |
| 2916158 | 10/1980 | Germany . |
| 0152415 | 11/1981 | Germany . |
| 3240136 | 5/1984 | Germany . |
| 3334252 | 4/1985 | Germany . |
| 3336245 | 4/1985 | Germany . |
| 3726585 | 2/1989 | Germany . |
| 3812101 | 11/1989 | Germany . |
| 58-034334 | 2/1983 | Japan . |
| 63-070139 | 3/1988 | Japan . |
| 1446554 | 12/1988 | U.S.S.R. . |
| 1710930 | 2/1992 | U.S.S.R. . |

OTHER PUBLICATIONS

Lord et al., "Attenuation of Elastic Waves in Pipelines as Applied to Acoustic Emission Leak Detection", Materials Evaluation, Nov. 1977 pp. 49–54.
Technisches Messen 58(1991), pp. 47–60 (Fuchs et al) "Acoustic Leak Detection on District Heating Pipelines".
Siemens Publ. Order No. A19100-U653-A212 (1990), pp. 2–12 "Alus Acoustic Leakage Monitoring System".
American Society for Nondestr. Testing, Jul. 1992 pp. 875–882 (Fowler) "Chemical Industry Application of Acoustic Emission".
American Society for Nondestr. Testing, Nov. 1989, pp. 1297–1300 (Kuperman) "Characterization of Acoustic Signals from Leaking Intergranular".
"Detect buried steam leaks with acoustics", Sabo, Electrical World, vol. 186, No. 1, Jul. 1, 1976, p. 40.

*Primary Examiner*—Hezron E. Williams
*Assistant Examiner*—Michael J. Brock
*Attorney, Agent, or Firm*—Herbert L. Lerner; Laurence A. Greenberg

[57] ABSTRACT

A method for ultrasonic leak location includes showing ultrasound levels measured at various measuring locations along a measuring segment in a bar diagram. An intersection of two straight lines in the bar diagram is ascertained to identify a leakage position. At least an individual ultrasound pickup is calibrated with respect to its amplification factor and/or its location error. An apparatus for ultrasonic leak location includes a number of ultrasound pickups being disposed along a measuring segment. Amplifiers and components forming an effective value connect outputs of the ultrasound pickups to a data processing system. The data processing system calibrates an individual ultrasound pickup with respect to its amplification factor and/or its location coordinate.

8 Claims, 2 Drawing Sheets

METHOD AND APPARATUS FOR CALIBRATING AN ULTRASONIC LEAK LOCATION

BACKGROUND OF THE INVENTION

Field of the Invention

The invention relates to a method for ultrasonic leak location, in which ultrasound levels measured at various measuring sites along a measurement segment are represented in a bar diagram, and in which the intersection of two straight lines in the bar diagram is ascertained to identify the location of the leakage. The invention also relates to an apparatus for ultrasonic leakage detection.

A method and an apparatus of the above-mentioned type are known from European Patent No. 0 140 174, particularly FIG. 5, and from a brochure entitled "ALÜS Acoustical Leakage Monitoring System," Order No. A19100-U653-A212, April 1990, published by Siemens A. G., Energy Production Division, D-91050 Erlangen, Germany.

The method of acoustical leakage monitoring under consideration herein is based on the fact that liquids, vapors or gases produce structure-borne sound as they flow out of a leak and in case of vapors or gases expand. The noises are propagated in affected components (such as pipelines, containers, pumps, valves) and are measured by sound transducers or sound pickups. The latter are mounted at certain intervals on the surface of the components being monitored.

The effective or r.m.s. value E (r.m.s.=root mean square) of the high-frequency sound transducer signals is used as a measuring variable according to the formula:

$$E = \sqrt{\frac{1}{T}\int E_{HF}^2 \cdot dt} = \left(\frac{1}{T}\int E_{HF}^2 \cdot dt\right)^{0.5}. \quad (1)$$

During normal operation, the flow noises generate a background signal level $E_o$. The sudden occurrence of a leak generates a leakage noise level $E_L$ at a location $x_i$ of the sound transducer (i=1, 2, ...), having a magnitude which depends on the size of the leak and on its distance from the sound transducer. A total noise level $E_{L,o}$ at the location $x_i$ of a transducer is the result of superposition of the leakage noise and operating noise, in accordance with the following formula:

$$E_{L,o} 32 (E_o^2 + E_L^2)^{0.5}. \quad (2)$$

That means that a leak which generates the same noise level as the operating noise at the location $x_i$ of the sound pickup raises the total noise level by approximately 40%, which is a rise that is readily measurable.

In order to locate the leak, the proportion determined by the leak noise must first be determined for each measuring site $x_i$, from the sound levels measured by the pickups. That is done in a known way by subtracting the background noise of the system, $E^2_o$, in accordance with the following formula:

$$E^2_L = E^2_{L,o} - E^2_o. \quad (3)$$

The net sound levels $E^2_L$ (or the corresponding value $E_L$) at the i different locations $x_i$ along the measuring segment are logarithmically shown in a bar diagram and, if a leak is present, the intersection of two straight lines, which will then be present, is utilized to identify the leakage location $x_L$. (When using the values $E_L$ instead of $E^2_L$ the same final results are obtained.)

In other words, in the method under consideration herein, the operating sound level (r.m.s. value) is monitored for anomalous changes in the ultrasonic range, using a plurality of permanently installed pickups. The frequency range is chosen in such a way that the high-frequency proportions of the leak noise that are above the operating sound level are detected, but the low-frequency, mechanically induced sound waves are filtered out. During normal operation, the r.m.s. values of the various pickups are largely constant. Conversely, leaks cause an increase in the values. Through the use of the known method, the proportion that can be ascribed solely to the leak is determined from that rise for each pickup. That proportion decreases according to the laws of physics as the distance from the leak increases.

As was already noted, that proportion is represented logarithmically as a function of the various pickup locations $x_i$ in the form of a bar diagram. Relatively long pipelines or branching pipelines are split up into monitoring segments, and for each segment one such bar diagram is prepared.

Within a component (flange, pump, etc.) of a system to be monitored, the sound propagation conditions as a rule are quite complicated, and they can only be individually detected with great difficulty. Accordingly, pickups used for leak location as a rule receive a sonic signal and from them, a priori, it is not possible to state exactly how strongly it has been damped. The pickup coupling also has an influence on the measured sound levels and on ascertaining the location. Since the former location method does not take such facts into account, its locating accuracy suffers.

SUMMARY OF THE INVENTION

It is accordingly an object of the invention to provide a method and an apparatus for calibrating an ultrasonic leak location, which overcomes the hereinafore-mentioned disadvantages of the heretofore-known methods and devices of this general type and which permit more accurate leakage location.

The invention is based on the concept that location errors and/or measuring errors can largely be prevented by calibrating the individual ultrasound pickup.

With the foregoing and other objects in view there is provided, in accordance with the invention, a method for ultrasonic leak location, which comprises showing ultrasound levels measured at various measuring locations along a measuring segment in a bar diagram; ascertaining an intersection of two straight lines in the bar diagram to identify a leakage position; and calibrating at least an individual ultrasound pickup with respect to its amplification factor and/or its location error.

In accordance with another mode of the invention, there is provided a method which comprises performing the calibrating step with a first transmitter transmitting along the measuring segment on one side of the ultrasound pickup and with a second transmitter transmitting on the other side of the ultrasound pickup.

In accordance with a further mode of the invention, there is provided a method which comprises measuring a first ultrasound level generated by the first transmitter with the ultrasound pickup and forming a first logarithmized signal from the first ultrasound level; measuring a second ultrasound level generated by the second transmitter with the ultrasound pickup and forming a second logarithmized signal from the second ultrasound level; and comparing the two signals with predetermined straight lines for producing a correction value for a location error and/or a correction value for an amplification factor error.

In accordance with an added mode of the invention, there is provided a method which comprises ascertaining the two straight lines with true-location and correctly mounted sensors, or measuring the two straight lines with a variable-location receiving sensor, or deriving the two straight lines from measurements along a different but comparable measuring segment.

With the objects of the invention in view, there is also provided an apparatus for ultrasonic leak location, comprising a number of ultrasound pickups being disposed along a measuring segment and having outputs; a data processing system; amplifiers; and components forming an effective value; the amplifiers and the components connecting the outputs of the ultrasound pickups to the data processing system; and the data processing system having means for calibrating an individual ultrasound pickup with respect to its amplification factor and/or its location coordinate.

In accordance with a concomitant feature of the invention, there are provided calibrating transmitters each being disposed at a respective side of the individual ultrasound pickup in the direction of the measuring segment, the calibrating transmitters issuing ultrasonic signals being measured by the ultrasound pickup.

Other features which are considered as characteristic for the invention are set forth in the appended claims.

Although the invention is illustrated and described herein as embodied in a method and an apparatus for calibrating an ultrasonic leak location, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

DESCRIPTION OF THE PREFERRED EMBODIMENTS

Figure 1:
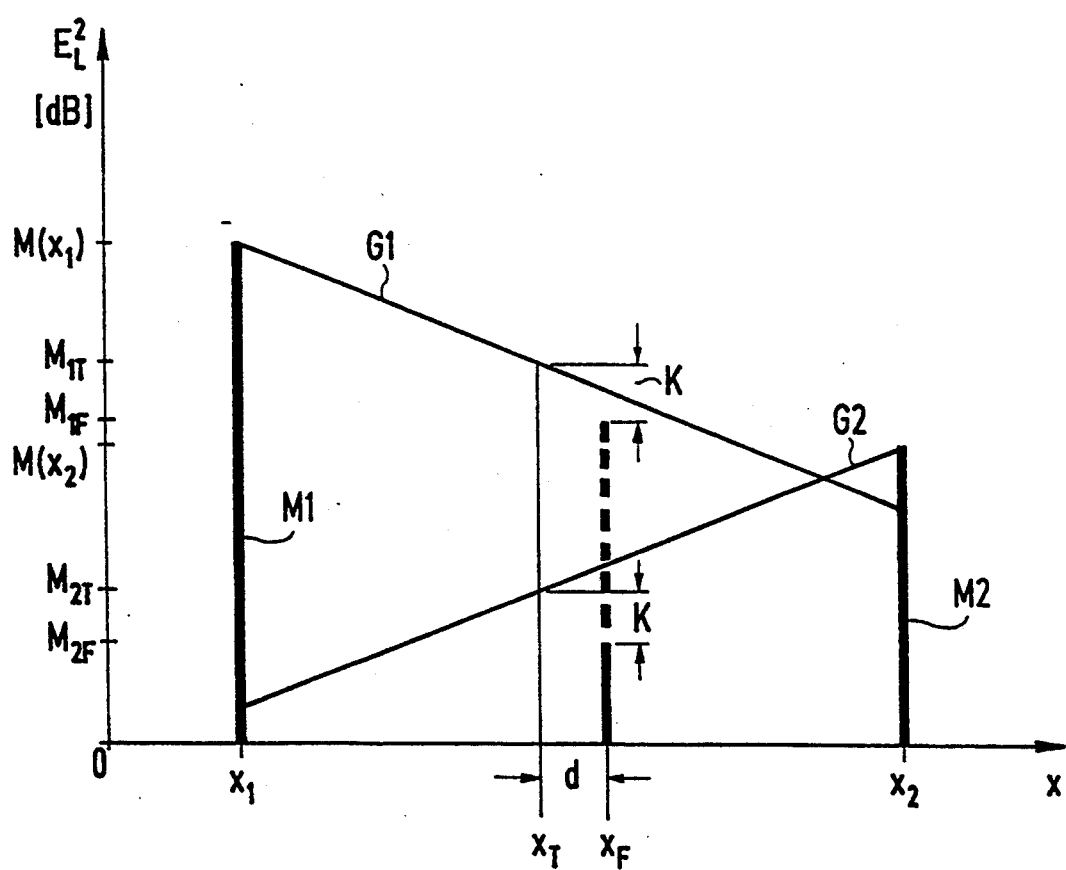
FIG. 1 is a bar diagram illustrating exemplary embodiments of the invention.

Referring now to the figure of the drawing in detail, it is assumed that for ultrasonic leak location along a measuring segment, a number of non-illustrated ultrasound pickups are provided which have levels that are measured. In order to perform the calibration, an individual sensor is predominantly selected, at a location $x_F$. This is because it is also assumed that a location determination $x_F$ of this sensor is inaccurate, and that this sensor itself is indicating wrongly, for example due to defective coupling or because of incorrect amplification of its output signal. Difficulties in this respect can arise especially when sudden changes in damping occur along the measuring segment. Determining a true location $x_T$ and a true level $M_T$ in this sensor, which is actually supposed to be indicated, is accordingly of significance for leak location determination. This is because one can say that the leak location determination in the later measurement is certainly wrong by the particular location error through which the sensor position had been incorrectly determined. This kind of position determination is often problematic in power plants, because access to some components is virtually impossible, for instance because of insulators mounted on such components. Due to such hindrances, it may be that the sensor position can only be accurately known to within a half meter, for instance. Despite such inaccuracy, the leak location should be determined as accurately as possible, for instance to an accuracy of several centimeters.

In order to achieve this, first and second straight measuring lines G1 and G2 are prepared in which an ultrasound level $E^2_L$ is represented logarithmically above a location x. These straight lines G1, G2 each extend from a point $x_1$ through a point $x_2$, specifically into a region on either side of the (incorrectly determined) sensor location $x_F$. It is then assumed that a first calibrating transmitter is positioned at the point $x_1$. This first transmitter outputs an ultrasonic signal, which is measured with the aid of the sensor at the point $x_F$ as a first measuring signal $M_{1F}$ (which is wrong, because of an amplification error). Correspondingly, a second calibrating transmitter is positioned at the point $x_2$. After the first transmitter has been turned off and the second transmitter has been turned on, its (likewise wrong) measuring signal $M_{2F}$ is ascertained with the aid of the applicable sensor.

The amplification and/or the location of the sensor can then be varied mathematically in such a way that the measurement signals $M_{1F}$ and $M_{2F}$ are located on the first and second straight measuring lines G1 and G2, respectively. In this way "actual" measurement values $M_{1T}$ and $M_{2T}$ are obtained. In this operation, a correction value d for ascertaining a location error ($d = x_F - x_T$) and a correction value for ascertaining an amplification error K ($K = M_{1T} - M_{1F} = M_{2T} - M_{2F}$) can be ascertained.

Regarding ascertaining the two straight measuring lines G1 and G2, the following can be noted: In a first option, they can be ascertained by means of true-location and correct sensors if the first or second calibrating transmitter is turned on. In a second option, these straight measuring lines G1, G2 can be measured at a different time with a calibrated measuring array and with a variable-location sensor. Finally, in a third option, these straight lines G1 and G2 may be predetermined by values found by trial and error and for instance obtained with a different system of the same type. The first option, which is preferred herein, accordingly involves the pickup of the first straight measuring line by means of the first calibrating transmitter and the pickup of the second straight measuring line G2 by means of the second calibrating transmitter. The second calibrating sensor G2 is disposed at a different point from the first calibrating transmitter G1, specifically on the other side of the presumptively incorrectly measuring and/or incorrectly positioned sensor (at the location $x_F$).

The following discussion will address the mathematical ascertainment of the correction variables d and K in somewhat more detail. These variables are of significance for the later high-precision leak location determination.

The first straight line G1 can be described as follows:

$$M_1 = -\alpha(x-x_1) + M(x_1)$$

Correspondingly, the second straight line G2 can be described as follows:

$$M_2 = +\alpha(x-x_2) + M(x_2)$$

The results of the measurement by means of the first and second transmitters are the values $M_{1F}$ and $M_{2F}$. The value $x_F$ is known. Thus the following equation applies for the true or actual sensor location $x_T$:

$$x_T = x_F - d$$

Since logarithmic values are predominantly used, it is also true that $$M_{1T} = M_{1F} + K \text{ and } M_{2T} = M_{2F} + K$$

From these equations, two equations can be formed with the unknowns d and K. The latter variables d and K can be determined from these two equations. Thus the true location $x_T$ and the true amplification $M_T$ of the sensor can then be determined.

Once this calibration has been carried out, the correction values d and K can be used in the ensuing location process. In the location determination, a subtraction of the correction value d takes place in each case in accordance with the equation $$x_T = x_F - d,$$

and in the level determination, an addition of the correction value K is performed in each case in accordance with the equation $$M_T = M_F(x_F) + K.$$

The correction values d and K for all of the sensors can be stored in memory in the form of a table in a computer. However, the values K may also lead to a correction in the amplifier setting for the individual amplifiers of the associated sensors.

Figure 2:
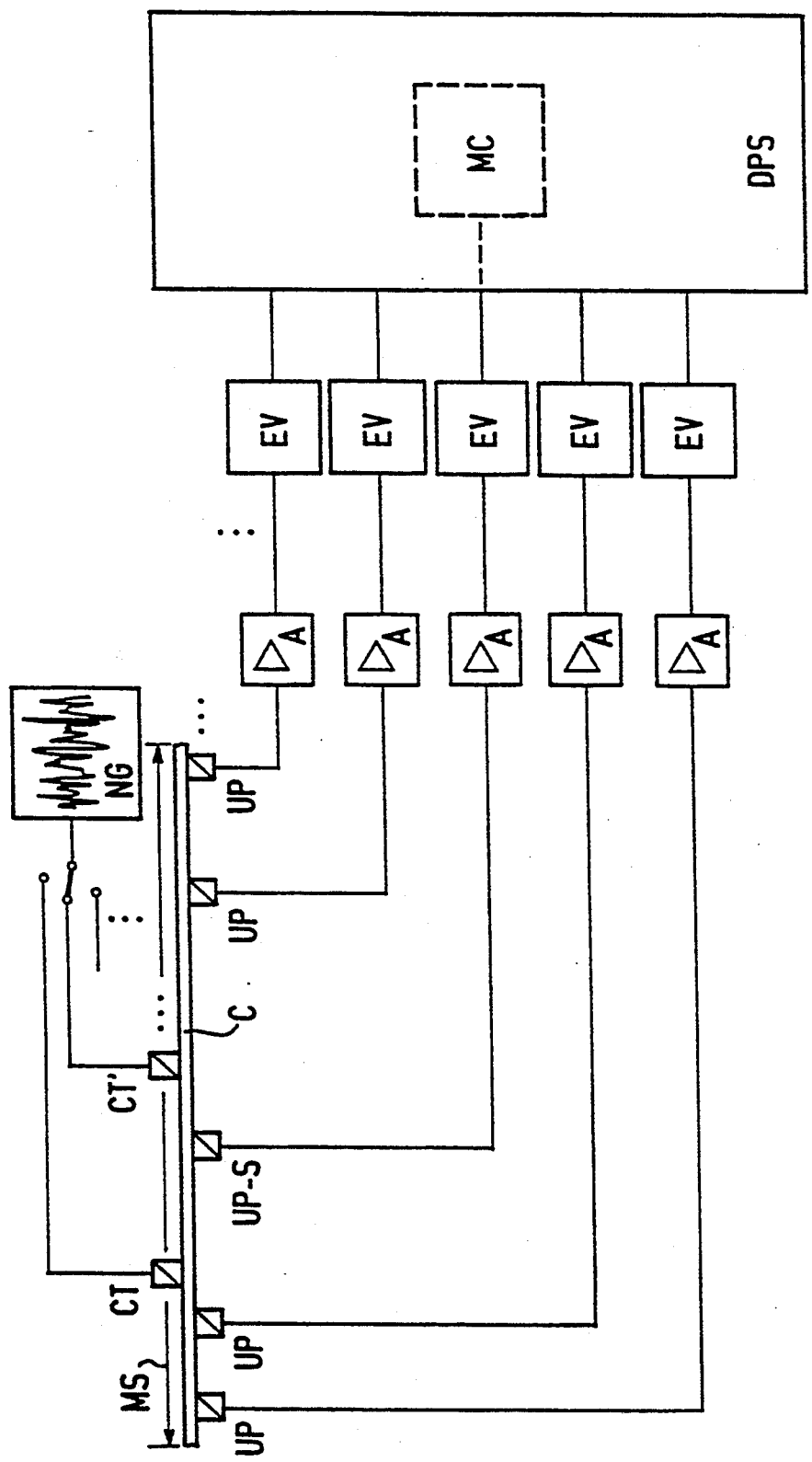
FIG. 2 illustrates a measuring segment of an affected component (e.g. pipe, valve, etc.) with several ultrasound pickups permanently mounted on it, amplifiers, components forming an affective value, and a data processing system.

FIG. 2 contains the principal measurement arrangement according to the invention. The drawing shows a measuring segment MS of an affected component C (e.g. pipe, valve, etc., herein simply drawn as straight pipe). A number of ultrasound pickups UP are disposed along the measuring segment MS and are fixly and permanently mounted at the affected component C. The output signals of the ultrasound pickups UP are lead to amplifiers A, which are connected to electrical components EV, the latter forming an effective value which will be processed within a data processing system DPS. The components EV forming the effective value may be stand alone components or may be parts of the data processing system DPS. The latter has electrical means MC for calibrating an individual ultrasound pickup, e.g. UP-S, factor and its location coordinate.

An ultrasound transmitter CT will be permanently or temporarily coupled onto the measuring segment of the affected component positioned on one side of the selected ultrasound pickup UP-S under calibration and a second transmitter CT on the other side of this selected ultrasound pickup UP-S under calibration. It is also possible to use one and only one transmitter CT or CT' subsequently at these two positions just mentioned. The transmitter will be supplied by an electrical noise generator NG and may be formed as stand alone component. Alternately, the noise generator NG and the transmitter CT, CT' may be remote controlled by the data processing system DPS.

We claim:

1. A method for ultrasonic leak location, which comprises:
    showing ultrasound levels measured at various measuring locations along a measuring segment in a bar diagram;
    ascertaining an intersection of two straight lines in the bar diagram to identify a leakage position; and
    calibrating at least an individual ultrasound pickup with respect to its amplification factor and its location error.

2. The method according to claim 1, which comprises performing the calibrating step with a first transmitter transmitting along the measuring segment on one side of the ultrasound pickup and with a second transmitter transmitting on the other side of the ultrasound pickup.

3. The method according to claim 2, which comprises measuring a first ultrasound level generated by the first transmitter with the ultrasound pickup and forming a first logarithmized signal from the first ultrasound level; measuring a second ultrasound level generated by the second transmitter with the ultrasound pickup and forming a second logarithmized signal from the second ultrasound level; and comparing the two signals with predetermined straight lines for producing at least one of a correction value for a location error and a correction value for an amplification factor error.

4. The method according to claim 3, which comprises ascertaining the two straight lines with true-location and correctly mounted sensors.

5. The method according to claim 3, which comprises determining the two straight lines with a variable-location receiving sensor.

6. The method according to claim 3, which comprises deriving the two straight lines from measurements along a different but comparable measuring segment.

7. An apparatus for ultrasonic leak location, comprising:
    a number of ultrasound pickups being disposed along a measuring segment and having outputs;
    a data processing system;
    amplifiers; and
    components forming an effective value;
    said amplifiers and said components connecting the outputs of said ultrasound pickups to said data processing system; and
    said data processing system having means for calibrating an individual ultrasound pickup with respect to its amplification factor and its location coordinate.

8. The apparatus according to claim 7, including calibrating transmitters each being disposed at a respective side of said individual ultrasound pickup in a direction defined by the measuring segment, said calibrating transmitters issuing ultrasonic signals being measured by said ultrasound pickup.

* * * * *